United States Patent Office 3,449,294
Patented June 10, 1969

3,449,294
METHOD FOR THE PREPARATION OF POLYMERS THAT CAN BE PHOTOCHEMICALLY CROSS-LINKED
Justus Danhäuser and Willibald Pelz, Leverkusen, Germany, assignors to Gevaert-Agfa N.V., Mortsel, Belgium, a Belgian company
No Drawing. Filed June 14, 1965, Ser. No. 463,918
Claims priority, application Germany, Mar. 3, 1965,
A 48,540
Int. Cl. C08g 17/14; C08f 27/10; C08b 15/06
U.S. Cl. 260—47                                    17 Claims

ABSTRACT OF THE DISCLOSURE

Improved light-sensitive polymers are described. The polymers are obtained by reacting a phenyl compound containing an isocyanate group and an azidosulphonyl or chlorosulphonyl group with an organic polymer containing hydrogen atoms reactive with an isocyanate. In the event the phenyl compound contains a chlorosulphonyl group, the polymer obtained is subsequently reacted with sodium azide to obtain a polymer having azidosulphonyl groups. The polymers described are initially soluble in organic solvents but are rendered insoluble under the influence of light due to cross-linking.

---

The present invention relates to a method for the preparation of polymeric organic products that can be photochemically cross-linked and by said cross-linking are rendered insoluble.

Products of the aforesaid type, with the most divergent compositions, are known already. For instance in German Patent 1,063,802 polymers are described containing in their side chains cinnamic acid groups through which, on exposure, cross-linking of the polymer chains occurs. These cinnamic acid groups containing polymers are prepared by reaction of cinnamic acid derivatives containing at least one isocyanate group with polymeric compounds containing as reaction partners for the isocyanate group active hydrogen atoms.

The known polymers, which are capable of being photochemically cross-linked, in many respects do not satisfy the practical requirements, particularly those with regard to sensitivity and chemical stability.

It is an object of the invention to provide a process for the preparation of new polymers showing improved light-sensitivity and chemical resistance.

It has now been found that highly light-sensitive layers of polymers, which are soluble in organic solvents, are obtained when phenyl compounds containing an isocyanate group and an azidosulphonyl group or chlorosulphonyl group are allowed to react with organic polymers containing active hydrogen atoms. The isocyanate group may be linked directly to the phenyl nucleus or through a bivalent radical.

Compounds in which the phenyl ring is substituted directly with an isocyanate group are favoured. In the case of an isocyanate group containing phenyl compound that bears a chlorosulphonyl group on the phenyl ring is used for reaction with the active hydrogen atoms of the polymeric material, the resulting polymeric reaction product must still be converted with sodium azide so that the chlorosulphonyl groups are converted into azidosulphonyl groups. Indeed, photochemical cross-linking of the polymer chains occurs through the azidosulphonyl groups.

The isocyanate group containing phenyl compounds may also contain whatever other substituents on the phenyl nucleus, for example: halogen atoms such as chlorine or bromine atoms, alkyl groups containing preferably at most 5 carbon atoms, alkoxy groups containing preferably at most 5 carbon atoms, aryl groups especially a phenyl group, a phenoxy group, a nitro group and the like. The choice of such like substituents is dependent on the properties conferred by these substituents to the polymers that are capable of being photochemically cross-linked. Consequently it is possible to influence certain properties such as the solubility in the desired way. Suitable isocyanate group containing phenyl compounds are for instance:

m-isocyanatobenzenesulphazide,
p-isocyanatobenzenesulphazide,
m-isocyanatobenzenesulphochloride,
p-isocyanatobenzenesulphochloride, and
2-chloro-5-azidosulphonyl-phenylisocyanate.

For the process according to the invention it is not necessary that the mentioned phenyl compounds contain free isocyanate groups. It is also possible to use substances with so-called latent isocyanate groups (Angewandte Chemie A 59,265 (1947)).

Examples of polymeric compounds that contain groups with active hydrogen atoms are for instance polymers containing hydroxyl groups, carboxyl groups, mercapto groups, primary and secondary amino groups, carbonamide groups, carbonimide groups, sulphonamide groups acidic methylene groups.

For the preparation from the above described reaction partners of compounds that are soluble in organic solvents and that, under the influence of light, cross-link and thus are rendered insoluble it is required that the reaction partners are chosen in such a way and converted in such reaction condition that a premature cross-linking, particularly a premature insolubilisation is avoided.

In the case the phenyl compound as defined above is allowed to react with a hydroxyl group containing polymer, which is preferably applied as polymer bearing active hydrogen atoms, the resulting polymeric material comprises in the polymer chain units that contain an azidosulphonyl-phenyl grouping linked to the polymer chain by means of an urethane radical. This grouping is characterised by the following

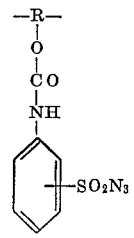

wherein R represents the polymer chain and wherein the phenyl ring of the azidosulphonyl-phenyl group may be substituted as already described above.

As high molecular weight reaction partners are suitable natural substances as well as synthetic high molecular weight compounds.

Suitable natural substances are for instance cellulose, starch and gelatin or modified derivatives of these neutral substances such as partly esterified or etherified cellulose.

Suitable synthetic polymers are for instance polyvinyl alcohols or copolymers containing vinyl alcohol units.

Any other units of polymerisable monomers, especially vinyl monomers, may be present as non-reactive polymer components in the polymer chain for instance units of ethylene, propylene, butylene, butadiene, isoprene, vinyl chloride, vinylidene chloride, vinyl ester, particularly vinyl acetate and vinyl propionate, vinyl ether, for instance vinyl propyl ether, vinyl isobutyl ether, acrylic or methacrylic acid, or derivatives thereof such as esters particularly those obtained with aliphatic alcohols containing at most 5 carbon atoms, nitriles, maleic anhydride, styrene and so on. Particularly suitable are the partly saponified copolymerisates of ethylene and vinyl acetate.

Polycondensates with active hydrogen atoms are also suitable, particularly those with alcoholic hydroxyl groups for instance polyesters of multivalent aliphatic or aromatic carboxylic acids with multivalent alcohols, hydroxyl groups containing polyurethanes or polyethers or hydroxyl groups containing epoxide resins as for instance obtained by conversion of multivalent carboxylic acids, alcohols or amines with epihalogenhydrins, particularly epichlorohydrin, further polyamides, for instance reaction products of multivalent carboxylic acids with multivalent amines.

The polymeric reaction partners should advantageously possess an average molecular weight of more than 1,000. The average molecular weight that is best suited for the use intended can be determined in a simple way by the usual tests. The optimum molecular weight range evidently also depends on the nature of the polymers. In the case of polycondensates products with relatively low molecular weight range from about 1,000–10,000 will in general be suitable. In the case of polymers in the narrow sense, particularly the polymerised vinyl compounds, products with molecular weights from above 10,000 to about 500,000 will do for most purposes. Polymers with molecular weights comprised between 15,000 and 250,000 are favoured.

It has been found that suitable polymers are those comprising from about 10 to 98 mole percent of structural units bearing active hydrogen atoms.

The polymeric components may be converted with the isocyanate groups containing phenylsulphazide or sulphochloride compounds in any ratio whatever. There should only be taken care that the azidosulphonyl groups are present in a sufficent amount for the desired cross-linking degree. For this purpose, particularly in the case of the favourably applied hydroxy groups containing polymers, it may be assumed that the isocyanate compounds react quantitatively.

For most purposes, products containing in the polymer chain one azidosulphonyl grouping per about 1 to 20 of other monomer units are usable. A ratio of 1 izidosulphonyl grouping to 3 to 10 other units is favoured. Particularly favourable results are obtained with polymers containing 1 azidosulphonyl group for 5–6 other monomers units.

Both reaction partners are suitably applied in approximately equivalent amounts. However, in the case a high molecular weight compound with a great number of groups containing active hydrogen atoms is used it is not necessary to use an equivalent amount of isocyanate groups containing phenyl sulphochloride and sulphazide compound. The remaining occasionally disturbing froups with active hydrogen atoms, particularly hydroxy groups, are suitably acylated in the known way with acylating agents or converted with isocyanates for instance with anthracene-2-isocyanate or cyclohexylisocyanate.

The reaction between the reaction partners is carried out in a solvent at room temperature or at a higher temperature. Suitable solvents are particularly formamide, dimethylformamide, cyclohexanone, acetone, butylacetate, pyriodine; in general all solvents that do not react with isocyanate groups are suitable.

In the case of the embodiment according to which first the polymeric sulphochloride is formed, the polymeric sulphochloride can be converted into the polymeric sulphazide by addition at normal or slightly increased temperature of a solution of sodium azide in water and dioxan or acetone to the obtained solution of the polymeric sulphochloride.

The products obtained according to the invention may be precipitated for purifying purposes in methanol or other lower alcohols and dissolved again in one of the above mentioned solvents or a mixture of these solvents. It is however also possible to use directly the solution obtained after the reaction between the reaction partners. From the clear solutions of the polymers that are capable of being cross-linked by light, films may be cast or fibres drawn by evaporating the solvent. For the preparation of films that are capable of being cross-linked by light the solutions of the polymers are applied by dipping, spraying or coating to any support such as sheets of paper, metal foils of aluminium, copper, zinc, iron, titanium, molybdenum, tantalum, silver and gold, further glass or plastics.

When the reaction products obtained according to the invention are exposed to actinic light their chemical and consequently their physical properties are more or less rapidly changed by cross-linking through the azidosulphonyl groups. According to the composition of the light-sensitive high molecular weight member the most divergent kinds of light sources may be used. Particularly suitable is light which consists for a great part of U.V. rays. The sensitivity for being photochemically cross-linked can still be increased by addition of sensitizers. As sensitizers may be used very advantageously: compounds of the class of the cyanine dyes, those of the class of the triphenylmethane dyes, those of the benzanthrone series, and those of the class of the quinones or anthraquinones. By the addition of these sensitizers the mentioned reaction products are sensitized particularly with respect to visible light. The cross-linking degree is dependent on the intensity of the exposure to light and on the number of azidosulphonyl groups present in the polymerisate. Consequently the cross-linking degree can easily be varied. By cross-linking of the materials prepared according to the invention said materials become insoluble, harder and resistant against acids, alkalies as well as solvents. The materials prepared according to the process of the invention, which are capable of being photochemically cross-linked, may for instance be applied for the preparation of coatings, sheets, etc. It is also possible to apply these materials for the preparation of moulded articles the surface of which can be improved by subsequent exposure to light.

The following examples illustrate the present invention.

EXAMPLE 1

To a solution of 10 g. of partly saponified copoly (ethylene/vinyl acetate) (29 parts by weight/71 parts by weight) which comprises 0.104 mole of free hydroxyl groups, in 200 ml. of dry pyridin are added 23.3 g. of p-isocyanato-benzenesulphazide dissolved in 100 ml. of cyclohexanone.

The mixture is stirred for 3 hours at 60–65° C. whereupon it is cooled till room temperature and then poured into 500 ml. of methanol. The precipitated rubber like polymer is washed with methanol and then redissolved in 350 ml. of cyclohexanone. After addition of 0.33 g. of Michler's ketone this solution may for instance be coated on a copper foil; this freshly applied layer is soluble in organic solvents. After having been exposed to sunlight for some time the layer has become insoluble and stable against aqueous acids.

Preparation of the p-isocyanato-benzenesulphazide 26 g. of sodium azide are dissolved in 60 ml. of water. To this solution is drop-wise added, while stirring and keeping the solution at 0–5° C., a solution of 47.6 g. of p-chlorosulphonyl-benzoyl chloride in 80 ml. of acetone. After the addition the mixture is stirred for one hour whereupon the whole is diluted with 200 ml. of water. The oil formed is separated and dissolved in 350 ml. of benzene. The solution is dried with calcium chloride and then heated at 80° C. for 4–5 hours. The reaction is complete when no evolution of gas takes place any more. The p-isocyanato-benzenesulphazide formed is precipitated with petroleum ether. However, the solution formed may also be used directly after the determination of the isocyanate content. Yield: 65–70%.

The preparation of m-isocyanato-benzenesulphazide and 2-chloro-5-azidosulphonyl-phenyl isocyanate occurs in an analogous way.

EXAMPLE 2

10 g. of an extensively saponified copoly(ethylene/vinyl acetate) (68 parts by weight/32 parts by weight), which comprises 0.051 mole of free hydroxyl groups, are dissolved at 70–80° C. in 200 ml. of cyclohexanone. A part (20–50 ml.) of the solvent is distilled in vacuum to remove the water still present in the reaction mixture. Then 11.4 g. of m-isocyanatobenzenesulphazide dissolved in 70 ml. of toluene is added. The mixture is stirred for 3 hours at 65° C. whereupon it is cooled till room temperature.

After addition of 0.3 g. of Michler's ketone the solution is diluted with butyl acetate up to 250 ml. The resulting solution is coated as a thin layer on a well cleaned zinc plate whereupon the layer is dried to the air for 3 minutes.

The freshly applied layer is soluble in the conventional organic solutions. However, by cross-linking caused by exposure the layer becomes chemically inert after a short time.

EXAMPLE 3

10 g. of a saponified copoly(vinyl acetate/vinyl chloride) (42 parts by weight/58 parts by weight), which comprises 0.054 mole of free hydroxyl groups, are dissolved in 200 ml. of dry cyclohexanone at 65° C. Then 11.5 g. of p-isocyanatobenzene sulphochloride dissolved in 70 ml. of toluene are added. The mixture is stirred for 3 hours at 65° C. whereupon it is cooled to room temperature. After addition of 4.5 g. of sodium azide dissolved in 20 ml. of water and 50 ml. of dioxan the mixture is stirred for 12 hours. Then benzene is added and the water present in the reaction mixture is distilled over in vacuum as an azeotropic mixture. To the water-free solution 0.22 g. of Michler's ketone is added whereupon the solution is filtered.

When this solution is applied as a layer to a metal plate, an acid-resistant protective layer is formed after a short exposure to light.

EXAMPLE 4

10 g. of a saponified copoly(vinyl acetate/vinyl chloride) (42 parts by weight/58 parts by weight), which comprises 0.054 mole of free hydroxyl groups, are dissolved in 200 ml. of dry cyclohexanone. Then 11.5 g. of m-isocyanatobenzene sulphochloride dissolved in 100 ml. of toluene are added. The mixture is stirred for 3 hours at 65° C. whereupon it is cooled. After addition of 4.5 g. of sodium azide dissolved in 20 ml. of water and 50 ml. of dioxan the mixture is stirred for 12 hours. The product obtained is precipitated in methanol and washed whereupon it is redissolved in 240 ml. of butyl acetate. After addition of 0.22 g. of 4-dimethylamino-benzaldehyde there is further proceeded as in Example 2.

EXAMPLE 5

20 g. of a hydroxyl group containing polyether, which is prepared from 2,2-bis(4-hydroxyphenyl)propane and epichlorohydrin and has an average molecular weight of more than 10.000 and 0.063 mole of free hydroxyl groups, is dissolved in 300 ml. of cyclohexanone. At 65° C. a solution of 13.8 g. of p-isocyanato-benzenesulphochloride in 70 ml. of cyclohexanone is added. The mixture is stirred for 3 hours at 60–70° C. whereupon it is cooled. Then 5.0 g. of sodium azide in 25 ml. of water and 70 ml. of dioxan are added whereupon there is further proceeded as in Example 4.

EXAMPLE 6

10 g. of partly hydrolyzed cellulose acetate, which contains 0.068 mole of free hydroxyl groups are dissolved in 150 ml. of water-free pyridine. At 40° C. 15.2 g. of p-isocyanato-benzenesulphazide dissolved in 80 ml. of toluene are added. The mixture is stirred for 3 hours whereupon there is further proceeded as in Example 1.

EXAMPLE 7

10 g. of a saponified copoly(vinyl acetate/vinyl chloride) (42 parts by weight/58 parts by weight), which contains 0.05 mole of free hydroxyl groups, are dissolved in 200 ml. of cyclohexanone. A part of the solvent (30–50 ml.) is vacuum-distilled in order to remove the water still present in the mixture. At 65° C., 12.8 g. of 2-chloro-5-azidosulphonyl phenyl isocyanate in 70 ml. of benzene are added. The mixture is stirred for 3 hours at 50° C. whereupon there is further proceeded as in Example 2.

What we claim is:

1. Process for the preparation of polymeric materials which are initially soluble in organic solvents and which become insoluble in the presence of actinic light comprising heating a phenyl sulphazide containing one isocyanate group with an organic polymeric compound selected from the group consisting of cellulose, starch, gelatin, vinyl polymers, polyesters, polyurethanes, polyethers, 1,2-polyepoxides, and polyamides containing hydrogen atoms reactive with an isocyanate group.

2. Process for the preparation of polymeric materials which are initially soluble in organic solvents and which becomes insoluble in the presence of actinic light comprising heating a phenyl sulphochloride containing one isocyanate group with an organic polymeric compound selected from the group consisting of cellulose, starch, gelatin, vinyl polymers, polyesters, polyurethanes, polyethers, 1,2-polyepoxides, and polyamides containing hydrogen atoms reactive with an isocyanate group and thereafter converting the sulphochloride group into a sulphazide group by contacting the polymeric material with sodium azide.

3. The process of claim 1 wherein the hydrogen atoms reactive with an isocyanate group belong to free hydroxyl groups.

4. The process of claim 2 wherein the hydrogen atoms reactive with an isocyanate group belong to free hydroxyl groups.

5. Process according to claim 2 wherein the recurring units of said polymeric compounds comprise from 10 to 98% of units containing hydrogen atoms reactive with an isocyanate.

6. Process according to claim 5 wherein said polymeric compounds are polymers of vinyl alcohol.

7. Process according to claim 6 wherein said copolymers are copolymers of vinyl alcohol and of one or more monomer(s) taken from the group consisting of: ethylene, vinyl chloride, vinyl esters and vinyl ethers.

8. Process according to claim 2 wherein said polymeric compounds have a molecular weight of from 1,000–10,000 and a plurality of hydroxyl groups and are selected from the group consisting of polyesters, polyethers, polyurethanes, and polyamides, the reactive hydrogen atoms being on said hydroxyl groups.

9. Process according to claim 8 wherein said polyether is obtained by polycondensation of 2,2-bis(4-hydroxyphenyl)propane and epichlorohydrin.

10. The process of claim 3 wherein the free hydroxyl groups belong to a member of the group selected from cellulose, partly esterified cellulose, and etherified cellulose.

11. A polymeric material which is initially soluble in organic solvents and which becomes insoluble in the presence of actinic light containing at least one polymer chain unit which is selected from the group consisting of cellulose, starch, gelatin, vinyl polymers, polyesters, polyurethanes, polyethers, 1,2-polyepoxides and polyamides which contains an azidosulphonyl-phenyl grouping linked to said polymer chain unit by means of a urethane radical for each 1 to 20 other monomeric units.

12. The polymeric material of claim 11 wherein the other monomeric units are vinyl alcohol units.

13. The polymeric material of claim 11 wherein the other monomeric units are vinyl alcohol units and at least one other unit selected from the group consisting of ethylene, vinyl acetate and vinyl chloride units.

14. The polymeric material of claim 11 wherein the azidosulphonyl phenyl grouping is linked by means of an urethane radical to a partly hydrolyzed cellulose acetate.

15. The polymeric material of claim 11 wherein the azidosulphonyl phenyl grouping is linked by means of an urethane radical to a polyether of 2,2-bis(4-hydroxyphenyl)propane and epichlorohydrin.

16. The product of the process of claim 1.

17. The product of the process of claim 2.

References Cited

UNITED STATES PATENTS 3,352,798  11/1967  Breslow et al.

WILLIAM H. SHORT, *Primary Examiner.*

T. PERTILLA, *Assistant Examiner.*

U.S. Cl. X.R.

117—124, 127, 152, 161; 260—2, 75, 77.5, 78, 79, 86.1, 91.1, 91.3, 117, 230